US012688851B2

(12) United States Patent
Yu et al.

(10) Patent No.: US 12,688,851 B2
(45) Date of Patent: Jul. 21, 2026

(54) VOICE BASED ACTIVATION DETECTION

(71) Applicant: International Business Machines Corporation, Armonk, NY (US)

(72) Inventors: Cheng Yun Yu, Beijing (CN); Yuan Jie Zhang, Ningbo (CN); Zhi Qiang Kou, Beijing (CN); Gui Lei Yang, Beijing (CN); Han Xu Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 18/605,404

(22) Filed: Mar. 14, 2024

(65) Prior Publication Data

US 2025/0292768 A1 Sep. 18, 2025

(51) Int. Cl.
| | |
|---|---|
| *G10L 15/22* | (2006.01) |
| *G10L 15/06* | (2013.01) |
| *G10L 15/08* | (2006.01) |
| *G10L 25/63* | (2013.01) |

(52) U.S. Cl.
CPC ............ *G10L 15/22* (2013.01); *G10L 15/063* (2013.01); *G10L 15/08* (2013.01); *G10L 25/63* (2013.01); *G10L 2015/088* (2013.01)

(58) Field of Classification Search
CPC ....... G10L 15/22; G10L 15/063; G10L 15/08; G10L 25/63; G10L 2015/088; G10L 25/51
See application file for complete search history.

(56) References Cited

U.S. PATENT DOCUMENTS

| | | |
|---|---|---|
| 9,548,053 B1 | 1/2017 | Basye et al. |
| 9,747,894 B2 | 8/2017 | Hsu et al. |
| 11,100,935 B2 | 8/2021 | Tukka et al. |
| (Continued) | | |

FOREIGN PATENT DOCUMENTS

WO 2023136449 A1 7/2023

OTHER PUBLICATIONS

Miksik et al., "Building Proactive Voice Assistants: When and How (not) to Interact," arXiv, 2020, 17 pages, retrieved from https://arxiv.org/abs/2005.01322.

(Continued)

*Primary Examiner* — Michael Colucci

(57) ABSTRACT

A computer-implemented method, according to one approach, includes: determining whether initial utterances received from a user include predetermined wake-up words. In response to determining that the initial utterances include the predetermined wake-up words, a voice assistant initiates an interaction with the user. In response to determining that the initial utterances in the audio signal stop for a predetermined period following the initial utterances that include the wake-up words, determining whether additional utterances are received from the user. In response to receiving additional utterances from the user, determining whether the additional utterances have an agitated tone. In situations where the additional utterances do not have an agitated tone, the additional utterances are processed. Furthermore, in response to determining that causing the additional utterances to be processed results in action being taken, the initial utterances are labeled as genuine dialog initiation entries.

16 Claims, 6 Drawing Sheets

(56) References Cited

U.S. PATENT DOCUMENTS

| | | | |
|---|---|---|---|
| 11,308,949 B2 | 4/2022 | DeLuca et al. | |
| 11,495,211 B2 * | 11/2022 | Kwatra | G10L 25/30 |
| 11,574,637 B1 * | 2/2023 | Kumar | G10L 15/22 |
| 11,823,670 B2 * | 11/2023 | Mitic | G10L 15/22 |
| 2015/0081296 A1 | 3/2015 | Lee et al. | |
| 2015/0248885 A1 * | 9/2015 | Koulomzin | G10L 15/08 |
| | | | 704/251 |
| 2017/0277993 A1 | 9/2017 | Beaver et al. | |
| 2018/0277113 A1 * | 9/2018 | Hartung | G10L 15/22 |
| 2018/0366117 A1 * | 12/2018 | Carreras | G10L 21/0216 |
| 2019/0035386 A1 * | 1/2019 | Leeb | G10L 15/063 |
| 2019/0051297 A1 * | 2/2019 | Knudson | G10L 15/22 |
| 2019/0073999 A1 * | 3/2019 | Prémont | G10L 15/08 |
| 2019/0325870 A1 * | 10/2019 | Mitic | G10L 15/22 |
| 2019/0371310 A1 * | 12/2019 | Fox | G10L 15/26 |
| 2021/0104221 A1 * | 4/2021 | Sharifi | G06F 18/217 |
| 2021/0256993 A1 | 8/2021 | Nachmani et al. | |
| 2021/0306751 A1 * | 9/2021 | Roach | H04R 1/1041 |
| 2021/0366476 A1 * | 11/2021 | Smith | G06F 3/167 |
| 2021/0375272 A1 * | 12/2021 | Madwed | G06F 3/167 |
| 2023/0419962 A1 * | 12/2023 | Kim | G10L 17/02 |
| 2024/0212689 A1 * | 6/2024 | Mohammad | G10L 17/02 |
| 2024/0310957 A1 * | 9/2024 | Shen | G06F 3/011 |

OTHER PUBLICATIONS

Kim et al., "Hi, Kia: A Speech Emotion Recognition Dataset for Wake-Up Words," Asia Pacific Signal and Information Processing Association Annual Summit and Conference (APSIPA), 2022, 6 pages, retrieved from https://arxiv.org/abs/2211.03371#:~:text=In%20this%20paper%2C%20we%20introduce,happy%2C%20sad%2C%20or%20neutral.

Lee et al., "Research on Chinese Speech Emotion Recognition Based on Deep Neural Network and Acoustic Features," Sensors, vol. 22, Jun. 23, 2022, pp. 1-16.

Bonet et al., "Speech Enhancement forWake-Up-Word detection in Voice Assistants," IberSPEECH, Mar. 2021, pp. 41-45.

* cited by examiner

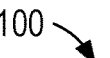

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

IMPROVED ACTIVATION CODE

150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

From operation
314

Receive an audio signal ~ 302

Convert a merged audio signal into individual
audio signals ~ 304

306

Does the audio
signal include predetermined
wake-up words or
phrases?     NO

YES

Cause a voice assistant to initiate an
interaction with the user ~ 308

310

Does the user pause
after uttering the wake-up words
and/or phrases?     NO

To operation
312

YES

To operation
316

300
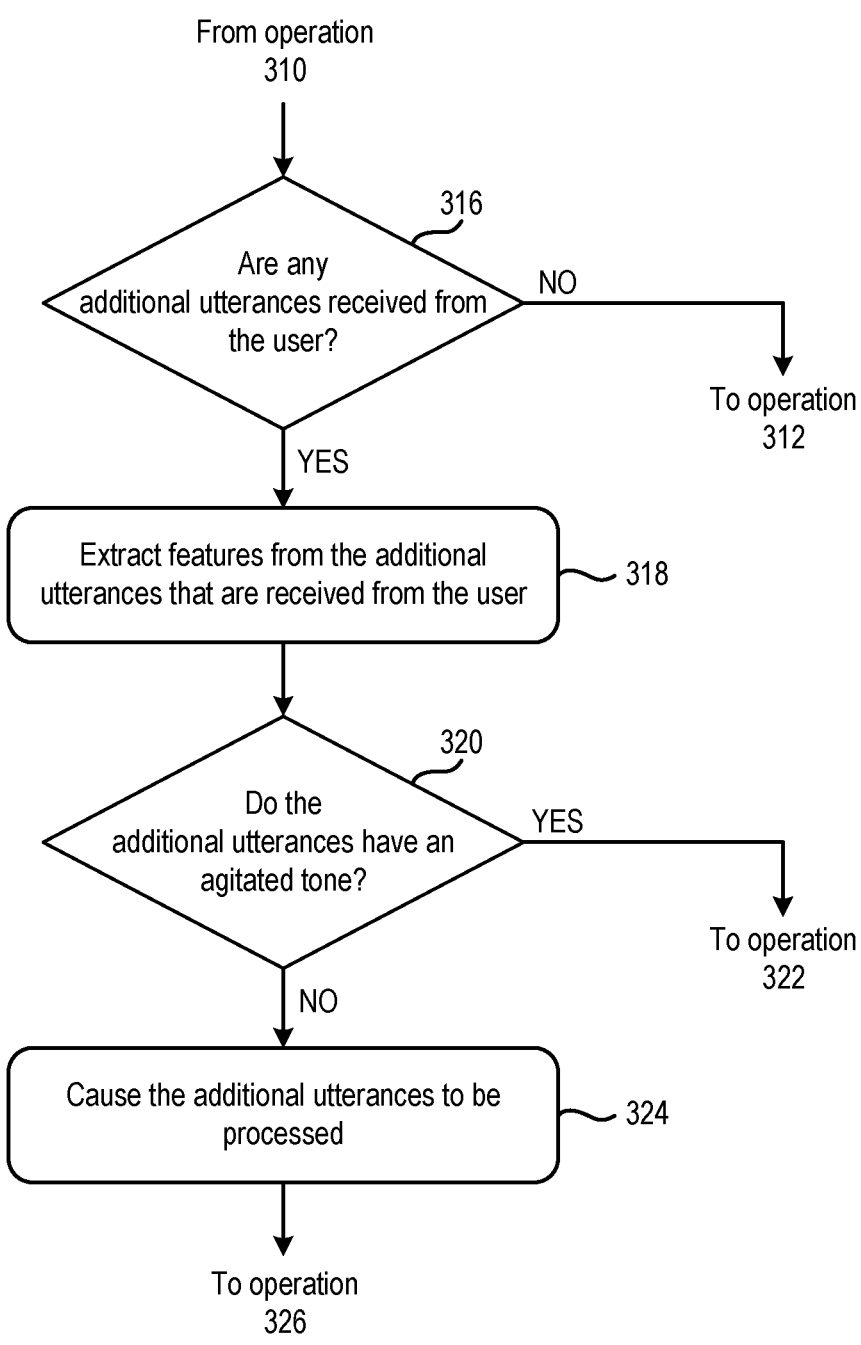
FIG. 3A
(Continued)

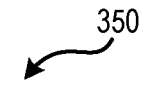
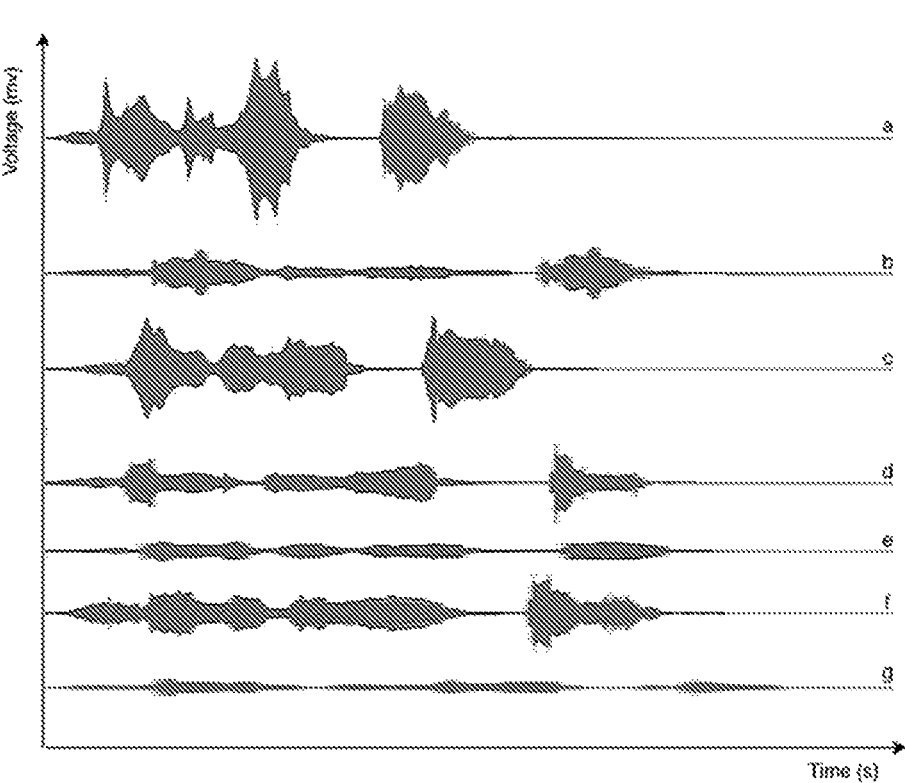
FIG. 3B

VOICE BASED ACTIVATION DETECTION

BACKGROUND

The present invention relates to voice assistants, and more specifically, this invention relates to user interactions with voice assistants.

Voice assistants include various types of software that is able to perform a range of tasks or services for a user based on user vocal inputs such as commands or questions. Voice assistant technologies often incorporate chatbot capabilities that are able to interpret and simulate human conversation, as well as respond via synthesized voices to facilitate interaction with their users.

Today, voice assistants are integrated into many different devices that are used on a daily basis, e.g., such as cell phones, computers, and smart speakers. Interactions with voice assistants are often initiated by the user speaking designated words and/or phrases. While this serves as a convenient way for users to initiate interactions, it also leads to a significant number of false activations. For example, designated words and/or phrases may come up in conversation in different contexts, thereby leading to unintentional activations. Similarly, users may enunciate words and/or phrases differently, leading to situations where voice assistants misinterpret utterances made by the users, and trigger unintended activations. Accordingly, there exists a need to develop an intelligent system that is able to accurately detect genuine user interactions.

SUMMARY

A computer-implemented method (CIM), according to one approach, includes: determining whether initial utterances received from a user include one or more predetermined wake-up words. In response to determining that the initial utterances include one or more of the predetermined wake-up words, a voice assistant initiates an interaction with the user. In response to determining that the initial utterances in the audio signal stop for a predetermined period following the initial utterances that include the wake-up words, determining whether additional utterances are received from the user in response to the predetermined period ending. In response to determining that additional utterances are received from the user, determining whether the additional utterances have an agitated tone. In response to determining that the additional utterances do not have an agitated tone, the additional utterances are processed. Furthermore, in response to determining that causing the additional utterances to be processed results in action being taken, labeling the initial utterances that include the wake-up words as genuine dialog initiation entries.

A computer program product (CPP), according to another approach, includes: a set of one or more computer-readable storage media, and program instructions. The program instructions are collectively stored in the set of one or more storage media, and are for causing a processor set to perform the foregoing CIM.

A computer system (CS), according to yet another approach, includes: a processor set, and a set of one or more computer-readable storage media. The CS also includes program instructions that are collectively stored in the set of one or more storage media, and which are for causing the processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

FIG. 3B is a graph that plots audio signal volume vs. time for several predetermined tones, in accordance with one approach.

DETAILED DESCRIPTION

Figure 2:
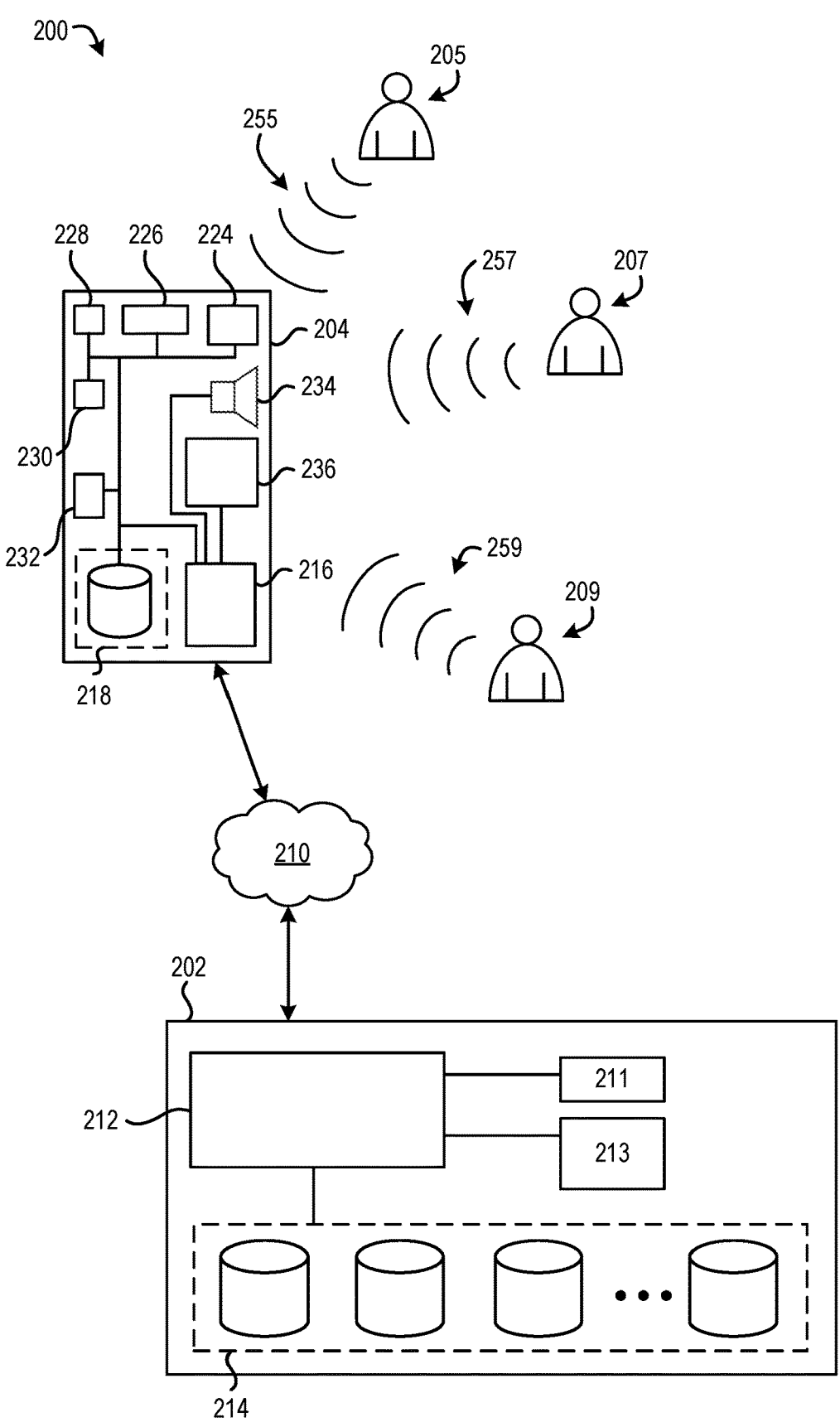
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for improving the accuracy with which voice assistants are activated by analyzing the soundwaves of detected speech, as well as other available contextual factors. The improved accuracy is achieved, at least in part, by analyzing the voice of the user and the wake-up utterances themselves. Additionally, the way that the user responds to the voice assistant being activated is evaluated to determine whether a genuine (e.g., intended) activation has occurred. Similarly, the tone of the words that are spoken by the user following an activation of the voice assistant may be taken into consideration when determining whether detected wake-up words and/or phrases correspond to a genuine activation attempt from the user, e.g., as will be described in further detail below.

In one general approach, a CIM includes: determining whether initial utterances received from a user include one or more predetermined wake-up words. In response to determining that the initial utterances include one or more of the predetermined wake-up words, a voice assistant initiates an interaction with the user. In response to determining that the initial utterances in the audio signal stop for a predetermined period following the initial utterances that include the wake-up words, determining whether additional utterances are received from the user in response to the predetermined period ending. In response to determining that additional utterances are received from the user, determining whether the additional utterances have an agitated tone. In response to determining that the additional utterances do not have an agitated tone, the additional utterances are processed. Furthermore, in response to determining that causing the additional utterances to be processed results in action being taken, labeling the initial utterances that include the wake-up words as genuine dialog initiation entries.

In another general approach, a CPP includes: a set of one or more computer-readable storage media, and program instructions. The program instructions are collectively stored in the set of one or more storage media, and are for causing a processor set to perform the foregoing CIM.

In yet another general approach, a CS includes: a processor set, and a set of one or more computer-readable storage media. The CS also includes program instructions that are collectively stored in the set of one or more storage media, and which are for causing the processor set to perform the foregoing CIM.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved activation code at block 150 for improving the accuracy with which voice assistants are activated by analyzing the soundwaves of detected speech, as well as other available contextual factors, e.g., as will be described in further detail below. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some approaches, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, voice assistants include various types of software that is able to perform a range of tasks or services for a user based on user vocal inputs such as commands or questions. Voice assistant technologies often incorporate chatbot capabilities that are able to interpret and simulate human conversation, as well as respond via synthesized voices to facilitate interaction with their users.

Today, voice assistants are integrated into many different devices that are used on a daily basis, e.g., such as cell phones, computers, and smart speakers. Interactions with voice assistants are often initiated by the user speaking designated words and/or phrases. While this serves as a convenient way for users to initiate interactions, it also leads to a significant number of false activations. For example, designated words and/or phrases may come up in conversation in different contexts, thereby leading to unintentional activations. Similarly, users may enunciate words and/or phrases differently, leading to situations where voice assistants misinterpret utterances made by the users, and trigger unintended activations. This strains the interface between the user and the voice assistant, ultimately detracting from the overall user experience.

In sharp contrast, approaches herein are desirably able to improve the accuracy with which voice assistants are activated (e.g., awoken) by analyzing the soundwave of user utterances (e.g., speech) as well as other contextual factors available in interactions between the user and the voice assistant. The improved accuracy is achieved, at least in part, by analyzing the voice of the user and the wake-up utterances themselves. Additionally, the way that the user responds to the voice assistant being activated is evaluated to determine whether a genuine (e.g., intended) activation has occurred. For example, determining whether the user pauses temporarily after speaking one or more predetermined wake-up words and/or phrases may be used to identify genuine activations. Similarly, the tone of the words that are spoken by the user following an activation of the voice assistant may be taken into consideration when determining whether detected wake-up words and/or phrases correspond to a genuine activation attempt from the user, e.g., as will be described in further detail below.

Looking now to FIG. 2, a system 200 configured to process audio signals (e.g., waveforms) received from one or more users and having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

Again, system 200 has a distributed architecture and is configured to process audio signals (also referred to herein as "waveforms") received from one or more users. As shown, the system 200 includes a central server 202 that is connected to a remote electronic device 204 that is accessible to users 205, 207, 209. Specifically, the central server 202 and the electronic device 204 are both connected to a network 210. The electronic device 204 and users 205, 207, 209 may thereby be positioned at any location that is able to establish a connection to network 210. The electronic device 204 and central server 202 may also be separated from each other such that they are positioned in different geographical locations.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. While the electronic device 204 and central server 202 are shown as being connected to network 210, two or more of the electronic devices may be connected differently depending on the approach. According to an example, which is in no way intended to limit the invention, two desktop computers may be located in the same office building and connected by a same wired network. In another example, which again is in no way intended to be limiting, edge compute nodes may be located relatively close to each other and connected by a wired connection, e.g., a cable, a fiber-optic link, a wire, etc.; etc., or any other type of connection which would be apparent to one skilled in the art after reading the present description.

With continued reference to FIG. 2, the electronic device 204 includes components that are configured to function as a voice assistant. In other words, the electronic device 204 is able to monitor various inputs received from users 205, 207, 209 and accurately identify genuine attempts by the users to initiate audio interactions with a voice assistant. For instance, audio signals 255, 257, 259 generated as a result of the users speaking words in a same environment as the electronic device 204 (e.g., within audio range of the microphone 230) are received and evaluated by the electronic device 204. While a number of audio signals 255, 257, 259 are received simultaneously at the electronic device 204, processor 216 and/or artificial intelligence (AI) module 236 are preferably able to extract individual audio signals corresponding to individual ones of the users 205, 207, 209. Additional audio processing may also be performed at the electronic device 204, e.g., such as noise filtering, volume boosting, etc.

It should also be noted that the term "voice assistant" as used herein is intended to refer to any combination of software and/or hardware that is able to perform a range of tasks or services for a user based on words in the utterances that are made by users (e.g., the vocal inputs of the users). The electronic device 204 may thereby incorporate various software applications or web interfaces that are designed to offer a voice assistant feature that mimics human conversation capabilities by interpreting and simulating human conversation, as well as responding via synthesized voices to facilitate interaction with their users, e.g., as would be appreciated by one skilled in the art after reading the present description.

AI based models are also preferably used to evaluate the audio signals that are received from users. For instance, the electronic device 204 includes an AI module 236 and processor 216 which may be used to train one or more AI based models to inspect audio signals that are received from users, and determine whether the audio signals include predetermined wake-up words and/or phrases therein. The AI module 236 may include any desired number and/or type of AI based models, e.g., such as machine learning models, deep learning models, neural networks, etc. According to some approaches, the AI based models may include one or more classification models that have been trained using supervised learning. For example, the AI based models may be trained in a supervised manner using audio datasets that have been extracted from recorded phone calls and meetings.

The AI based models may also be trained to process different languages. For instance, in some approaches the models may be trained using a Mandarin conversational speech corpus (e.g., MAGICDATA), a Chinese conversational meeting (web) speech corpus (e.g., ASR-CCMEETINGSC), a multi-channel Mandarin multi-party meeting transcription challenge, etc., such that the AI based models are able to interpret audio signals that contain words and phrases that are spoken in Mandarin. It follows that the AI based models may be trained to interpret words and/or phrases from any desired language(s). Similarly, models that have been trained for a specific language may be modified to interpret other languages by supplementing training.

The AI based models may be trained by separating the utterances in the training data into segments of phrases. Moreover, the phrases which include utterances identified as attempting to initiate conversation with another person may be labeled as positive, while remaining phrases and utterances are labeled as negative for not attempting to initiate conversation. Features may also be extracted from the soundwaves of the utterance audio strips. The features and labels may thereby be used to train AI based models to recognize the tone utterances identified in the testing data as seeking to initiate conversation. The AI based models may thereby be able to evaluate different characteristics of new audio signals that are received from users, and accurately identify genuine attempts by the users to initiate audio interactions with the voice assistant. In some approaches, this involves evaluating the user's tones while making utterances, particularly while making utterances that include predetermined wake-up words and/or phrases.

Results of the audio signal evaluations may also be used to retrain the AI based models, thereby creating a positive feedback loop which is able to improve accuracy over time, allowing the models to more efficiently identify genuine attempts by users to interact with the voice assistant. In other words, the AI based models may continue to be trained (e.g., retrained) using the result of how user utterances are processed over time, e.g., as will be described in further detail below. It follows that the processor 216 and/or AI module 236 in the electronic device 204 may perform any one or more of the operations described below in method 300 of FIG. 3A in order to improve the accuracy with which genuine attempts by the users to initiate audio interactions with a voice assistant are identified and successfully processed.

With continued reference to FIG. 2, the processor 216 is coupled to memory 218, which may include hard disk drives, solid state memory, optical memory drives, etc. depending on the approach. The processor 216 is also connected to an optional display screen 224, a physical user interface 226 (e.g., physical pushbutton array integrated in the exterior surface of the electronic device 204), a selector 228, a microphone 230, a camera 232, and an AI module 236. The processor 216 may thereby be configured to receive a variety of inputs through one or more of the microphone 230, the physical user interface 226, selector 228, and camera 232, e.g., as entered by the users 205, 207, 209. Some of the inputs may correspond to information presented on the optional display screen 224 and/or emitted by speaker 234 while the entries were received. Moreover, the inputs received may impact the information emitted by speaker 234, data stored in memory 218, information collected from the microphone 230 and/or camera 232, status of an operating system being implemented by processor 216, etc.

The central data storage location 202 includes a large (e.g., robust) processor 212 coupled to a cache 211, an AI module 213, and a data storage array 214 having a relatively high storage capacity. The data storage array 214 may include any desired type of data storage components depending on the approach. Thus, while the data storage array 214 may be illustrated as including hard disk drives, this is in no way intended to be limiting. In other approaches, the array 214 may include solid state drives having volatile and/or non-volatile memory therein, magnetic tape drives, optical storage drives, etc.

As described above with respect to AI module 236, AI module 213 may include any desired number and/or type of AI based models, e.g., such as machine learning models, deep learning models, neural networks, etc. AI module 213 may thereby be able to evaluate different characteristics of the audio signals that are received from users, and accurately identify genuine attempts by the users to initiate audio interactions with the voice assistant. It follows that in some approaches, audio signals that are recorded at a user location may be transmitted to the central server 202 for evaluation using the AI based models of AI module 236. In some approaches, this involves evaluating the user's tones while making utterances, particularly while making utterances that include predetermined wake-up words and/or phrases.

Results of the audio signal evaluations performed by AI module 213 may also be used to retrain the AI based models, thereby creating a positive feedback loop which is able to improve accuracy over time, allowing the models to more efficiently identify genuine attempts by users to interact with the voice assistant. In other words, the AI based models implemented by AI module 213 may continue to be trained (e.g., retrained) using the result of how user utterances are processed over time, e.g., as will be described in further detail below. It follows that the processor 212 and/or AI module 213 may perform one or more of the operations described below in method 300 of FIG. 3A in order to improve the accuracy with which genuine attempts by the users to initiate audio interactions with a voice assistant are identified at a central processing location, e.g., as will be described in further detail below.

The central server 202 may also store at least some information about the electronic device 204 and/or users 205, 207, 209. For instance, user defined authentication information (e.g., password phrases), user-specific information (e.g., accents, grammatical patterns, spoken language, volume profiles, cadence and/or inflection profiles, etc.), application preferences, performance metrics, etc., may be collected by the electronic device 204 from the users 205, 207, 209 over time. This collected information may be used to train (e.g., continually retrain) the one or more AI based models that are maintained at the AI module 213 and/or stored in memory (e.g., data storage array 214 and/or cache 211) for future use. Additionally, at least some of the information that is collected from the users 205, 207, 209 may be hashed and randomized before being stored in memory in some approaches. For instance, some approaches include encrypting and storing preferential selections, geographical location information, passwords, etc. This information can later be used to determine whether a particular audio signal corresponds to a genuine attempt to initiate an audio interaction with a voice assistant.

Figure 3A:
FIG. 3A is a flowchart of a method, in accordance with one approach.
Figure 3A:
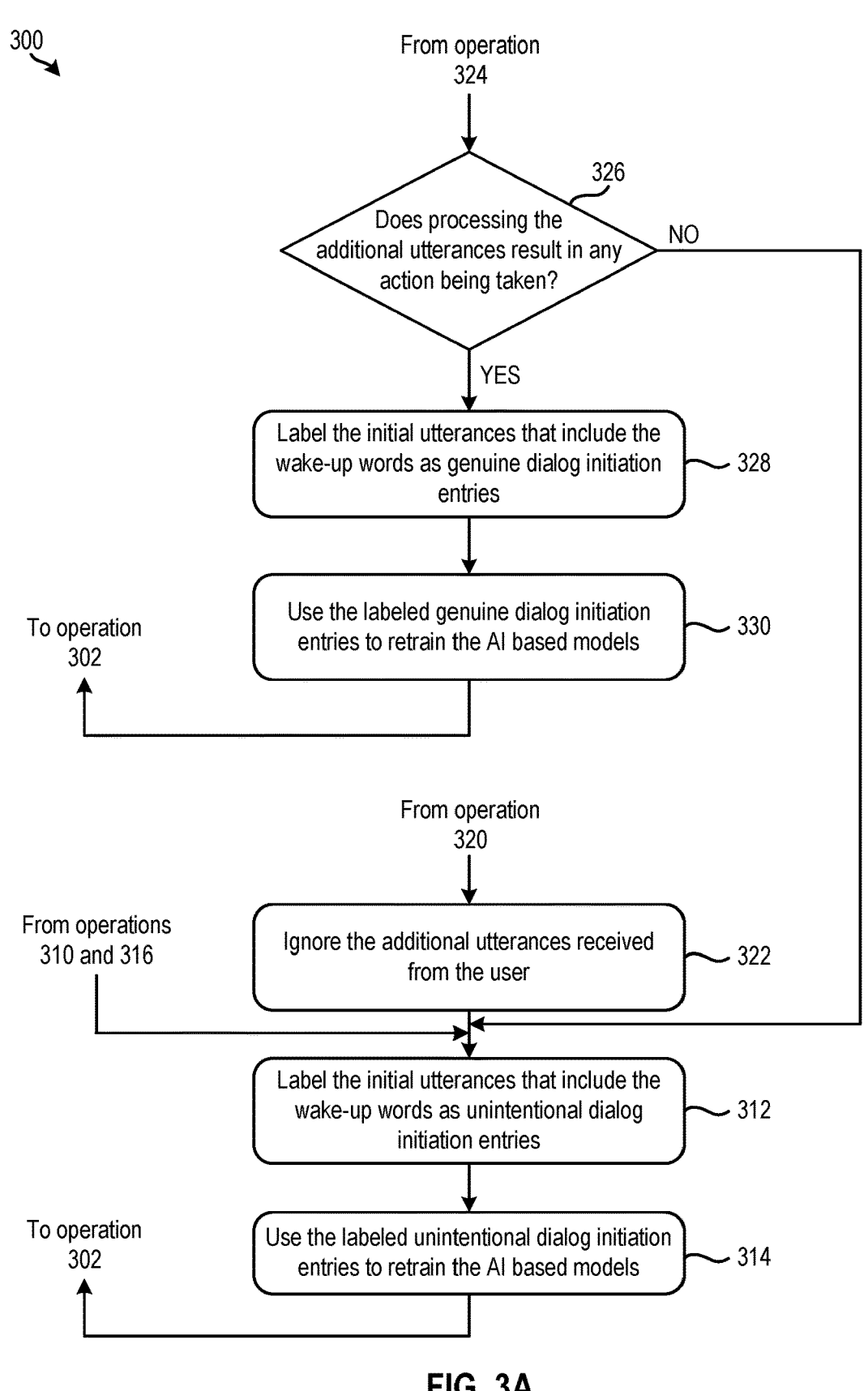

Looking now to FIG. 3A, a flowchart of a computer-implemented method 300 for improving the accuracy with which voice assistants are activated by analyzing the soundwaves of detected speech, as well as other available contextual factors, is illustrated in accordance with one approach. The improved accuracy is achieved, at least in part, by analyzing the voice of the user and the wake-up utterances themselves. Additionally, the way that the user responds to the voice assistant being activated is evaluated to determine whether a genuine (e.g., intended) activation has occurred. For example, determining whether the user pauses temporarily after speaking one or more predetermined wake-up words and/or phrases may be used to identify genuine activations. Similarly, the tone of the words that are spoken by the user following an activation of the voice assistant may be taken into consideration when determining whether detected wake-up words and/or phrases correspond to a genuine activation attempt from the user.

The method 300 may be performed in accordance with the present invention in any of the environments depicted in FIGS. 1-2, among others, in various approaches. For instance, one or more operations in method 300 may be performed by components in the central server 202 of FIG. 2. Moreover, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, in various implementations, the method 300 may be partially or entirely performed by a controller, a processor (e.g., see processor 212 and/or 216 of FIG. 2), one or more machine learning models (e.g., see machine learning module 213 and/or 236 of FIG. 2), etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3A, operation 302 of method 300 includes receiving an audio signal that includes words that have been spoken by one or more users. In other words, an audio signal that captures the utterances that have been made by a user is received. In some approaches, operation 302 may be performed by a device located in proximity to (e.g., within earshot of) the user(s) that created the audio signals. In such approaches the audio signal may be received directly from the users by a microphone. In other approaches, operation 302 may be performed at a central processing location, whereby the audio signals may be received over a network from a device that actually recorded the audio signals.

As noted above, approaches herein are preferably able to interpret merged audio signals and extract individual audio signals therefrom. Accordingly, optional operation 304 is performed in response to receiving a mixed audio signal that includes utterances made by multiple users at the same time. Optional operation 304 may also be performed in response to receiving a signal that includes words spoken by a user that are mixed with ambient sounds (e.g., noise). There, optional operation 304 includes extracting individual audio signals from the mixed audio signal. In other words, operation 304 includes converting the merged audio signal into individual audio signals, each of which include the words that have been spoken by a respective user. The individual audio signals may be extracted using voice isolation procedures, or any other signal processing techniques which would be apparent to one skilled in the art after reading the present description.

Proceeding to operation 306, a determination is made as to whether the received audio signal includes one or more predetermined wake-up words and/or phrases that have been spoken by the user. Operation 306 also determines whether the predetermined wake-up words and/or phrases have been spoken by the user in a specific tone, e.g., that indicates the user is attempting to activate (e.g., "wake up") a voice assistant. In other words, operation 306 determines whether the user has attempted to activate a voice assistant and initiate an interaction therewith. It follows that in some approaches, operation 306 involves converting the audio signal into textual representations of the words and/or phrases spoken by the respective user, and comparing the textual representations to a list of predetermined wake-up words and/or phrases.

In some approaches, operation 306 is repeated for each of the individual audio signals that are extracted from a mixed audio signal in optional operation 304. It follows that each of the individual audio signals determined as including one or more of the predetermined wake-up words and/or phrases may advance to operation 308. However, audio signals determined as not including any of the predetermined wake-up words and/or phrases do not cause the voice assistant to be activated. Accordingly, method 300 is shown as returning to operation 302 from operation 306 in response to determining that the individual audio signals do not include any of the predetermined wake-up words and/or phrases. Method 300 is thereby able to continue monitoring audio signals that are received from users.

As previously mentioned, trained AI based models may be used to determine whether the words in an audio recording include one or more predetermined wake-up words and/or phrases. In other words, the AI based models are used to evaluate the utterances that are initially made by users, and determine whether any of the utterances indicate a user is attempting to activate the voice assistant. The AI based models may thereby be trained to recognize patterns in characteristics of the audio signals that are received. In some approaches, this involves evaluating the user's tones while producing in the initial utterances, particularly the initial utterances that include the wake-up words and/or phrases.

For example, the AI based models may be trained to identify that genuine attempts at interacting with a voice assistant are initiated by stating the wake-up words and/or phrases with a raised voice. In other words, users may typically state the wake-up words and/or phrases at a volume that is higher than average. The AI based models may also be trained to identify patterns in how users enunciate the wake-up words and/or phrases, the speed at which the users state the wake-up words and/or phrases, the pitch of the user's voice while stating the wake-up words and/or phrases, turbulence in the sound waves, the frequency of the turbulence, etc. The AI based models may also be trained to identify patterns in the tone of the words that are received. For instance, utterances that are received having a tone that indicates dialog initiation is desired may be used to activate the voice assistant. However, utterances that are received having a tone that indicates dialog initiation is not desired may be used to determine the utterances should simply be ignored (e.g., see operation 322).

It follows that the AI based models are trained to detect genuine attempts to activate a voice assistant program, and differentiate the genuine attempts from inadvertent activations. Moreover, by continuing to train (e.g., retrain) the AI based models based on performance experienced over time, the efficiency at which genuine attempts to activate the voice assistant program are identified may further be increased, e.g., as will be described in further detail below.

With continued reference to FIG. 3A, method 300 advances to operation 308 from operation 306 in response to determining that initial utterances extracted from the received audio signal include one or more predetermined wake-up words and/or phrases. In other words, method 300 advances to operation 308 in response to the AI based models evaluating various details of the audio signals received and determining that the audio signals include predetermined wake-up words and/or phrases that have been pronounced by one or more of the users. There, operation 308 includes causing a voice assistant to initiate an interaction with the user. In other words, operation 308 includes initiating an audio based interaction between the requesting user(s) and the voice assistant. This may be achieved by sending one or more instructions that result in the interaction being initiated.

In some approaches, operation 308 includes sending one or more instructions that cause a speaker to emit an activation phrase or sound (e.g., chime) that is configured to notify the user their wake-up words were received and ultimately caused the voice assistant to be activated. In other approaches, a notification may be sent to the requesting user, a status of the voice assistant may be displayed on a screen, etc., to convey whether the voice assistant has been activated.

From operation 308, method 300 advances to operation 310. There, operation 310 includes determining whether the received audio signal includes any utterances that are made during a period that follows the wake-up words and/or phrases. In other words, operation 310 includes determining whether the user stops speaking and is quiet for a brief period after making the initial utterances that included the wake-up words and/or phrases.

Again, the AI based models are able to identify patterns that can be used to determine whether received audio signals include genuine attempts to activate a voice assistant. For instance, a user briefly pausing between attempting to wake the voice assistant and actually entering an audible (vocal) request or command may be identified by the AI based models as corresponding to a genuine attempt to activate the voice assistant. However, situations where the user continues talking without pausing to determine whether the voice assistant was successfully activated indicate that the user was not concerned with the status of the voice assistant.

The length of the pause that follows wake-up words and/or phrases may also be taken into consideration. For example, operation 310 may include determining whether the pause is in a predetermined range. Again, details associated with the received audio signals, e.g., such as the cadence of the words spoken by the user, may be used to identify genuine attempts in comparison to situations where the wake-up words are stated by mistake or in different contexts (e.g., happen to come up in the context of a conversation two or more users are having in proximity to an audio signal receiver). In some approaches, the presence and/or length of a pause following the activation of a voice assistant may be determined by comparing timestamps. For instance, a timestamp corresponding to when the voice assistant is activated may be compared with a timestamp corresponding to the first apparent pause in the user utterance after mentioning the wake-up words and/or phrases. Similarly, a timestamp corresponding to when the voice assistant is activated may be compared with a timestamp corresponding to the user utterances that are received following the voice assistant being activated.

In response to determining that the initial utterances in the audio signal do not stop for a predetermined period following the initial utterances that include the wake-up words, method 300 jumps from operation 310 directly to operation 312. There, operation 312 includes labeling the initial utterances that include the wake-up words as unintentional dialog initiation entries. In other words, operation 312 includes creating a labeled set of training data that may be used to retrain the AI based models implemented in operation 306 to initially identify the wake-up words and/or phrases.

Moreover, operation 314 includes using the labeled unintentional dialog initiation entries to retrain the AI based models. As noted above, the fact that method 300 continually retrains the AI based models using the determined results, allows for the models to make more accurate determinations over time. Thus, as operations of method 300 are repeated for audio signals received over time, the accuracy with which voice assistant is activated (e.g., awoken) is significantly improved. Accordingly, method 300 returns to operation 302 from operation 314, e.g., such that additional audio signals may be received and evaluated using the retrained AI based models.

Returning to operation 310, method 300 proceeds to operation 316 in response to determining that the initial utterances in the audio signal do stop for a predetermined period following the initial utterances that include the wake-up words. There, operation 316 includes determining whether additional utterances are received from the user in response to the predetermined period ending. In other words, operation 316 includes determining whether the user states additional words after the voice assistant initiates an interaction with the user. In situations where the user does not state any additional words and remains silent following the detected wake-up words and/or phrases, it may be determined that the user did not intend to activate the voice assistant. For example, the user may remain silent in response to hearing an activation chime from the voice assistant in an attempt to cause the voice assistant to time-out and return to an inactive state.

In response to determining that additional utterances are not received from the user following the initial utterances that include the wake-up words and/or phrases, method 300 jumps from operation 316 directly to operation 312. As noted above, operation 312 includes labeling the initial utterances that include the wake-up words as unintentional dialog initiation entries. Operation 312 thereby creates a labeled set of training data that may be used to retrain the AI based models implemented in operation 306 to initially identify the wake-up words and/or phrases. See operation 314.

Returning to operation 316, method 300 advances to operation 318 in response to determining that additional utterances are received from the user following the initial utterances that include the wake-up words and/or phrases. There, operation 318 includes extracting features from the additional utterances that are received from the user. In other words, operation 318 includes collecting details that outline different characteristics of the additional utterances received from the user in response to the voice assistant being activated.

In some approaches, the features that are extracted from the additional utterances received from the user include a spectral centroid value. The spectral centroid value may represent the overall average energy that is within a certain frequency range of the audio signals that include the additional utterances. The spectral centroid value may also represent the frequency distribution trend of the waveform that corresponds to the audio signals. The spectral centroid value is thereby able to identify whether an audio signal (e.g., sound) is biased towards higher or lower frequencies, by reflecting the brightness of the sound, e.g., as would be appreciated by one skilled in the art after reading the present description.

In other approaches, the features that are extracted from the additional utterances received from the user include a spectral flatness value. Determining this spectral flatness value includes identifying the ratio of a geometric average vs. an arithmetic average. The resulting value represents a flatness of the energy distribution in a waveform of an audio signal. It follows that the flatter the waveform is, the stabler (e.g., steadier) the sound is.

In other approaches, the features that are extracted from the additional utterances received from the user include a spectral contrast value. The spectral contrast value may be determined by computing the average energy between the peaks and valleys of an audio signal waveform. It follows that as the contrast increases, the sound becomes clearer. Moreover, the clearer a voice is, the more likely the sound assistant is able to register and comprehend it.

In other approaches, the features that are extracted from the additional utterances received from the user include a spectral roll-off value. The spectral roll-off value may be determined in situations where the center frequency of the amplitude distribution for an audio recording is below a predetermined percentage. The spectral roll-off value may thereby be used to distinguish between voiced speech and clear speech, e.g., as would be appreciated by one skilled in the art after reading the present description.

In other approaches, the features that are extracted from the additional utterances received from the user include a chroma feature, which represents the overall rhythm of the audio. In still other approaches, the features that are extracted from the additional utterances received from the user include a zero-crossing rate. The zero-crossing rate may be identified by determining the number of times an audio wave (e.g., waveform) passes through the zero axis. The higher the zero-crossing rate for an audio signal is the more likely the audio signal is noise. However, the lower the zero-crossing rate is for an audio signal, the more likely the audio signal is intended for a voice assistant.

In other approaches, the features that are extracted from the additional utterances received from the user include a root mean square energy value. The root mean square energy value may be extracted by determining how often a waveform of the audio signals deviates from an average value. The energy value may thereby extend as sound fluctuates.

In other approaches, the features that are extracted from the additional utterances received from the user include a Mel frequency cepstral coefficient. The coefficient may be determined by first modifying energy spectrum features to better approximate the human auditory system. The resulting coefficient may thereby more accurately describe the overall energy distribution of signals as they are received by a human ear. However, it should be noted that any other desired features (e.g., values) may be extracted from the additional utterances received from the user.

The waveform comparisons may be performed on the additional utterances that are received from the user. The waveform comparison may involve gathering audio signals of utterances containing the wake-up words, and generating amplitude-over-time waves based on the frequency and/or energy of the audio signals. Moreover, features may be extracted from the waveform and used to train (e.g., retrain) the AI based models. In some implementations, one or more of the AI based models include a pre-trained binary classification model.

In still other approaches, operation 318 may include extracting the analog audio signals and performing signal processing thereon. In other approaches, operation 318 may include converting the analog audio signals into digital representations, e.g., such that additional processing may be performed on the audio signals to extract additional digital features therefrom.

From operation 318, method 300 advances to operation 320. There, operation 320 includes determining whether the additional utterances have an agitated tone. In other words, operation 320 includes using the features extracted in operation 318 to determine whether the additional utterances, received from the user following the initial utterances that include the wake-up words and/or phrases, convey that the user was upset, angry, bothered, annoyed, etc. while they spoke. For example, the volume of the additional utterances, the speed at which the additional utterances are stated, the rhythm at which the user speaks, the amount and/or type of turbulences in the audio signals, etc., may be used to determine the tone(s) of the utterances.

According to some approaches, a set of AI based models may be trained to detect a specific sentiment in the utterances made by a user while verbally interacting with their environment. The AI based models may be trained using one or more training datasets that have been developed from labeled audio datasets of various sentiments for different languages. For example, labeled Mandarin audio datasets of various sentiments including Mandarin emotion speech datasets such as EMOVIE, Mandarin Affective Speech database, etc. The training dataset may be used by extracting features from the soundwaves in the audio recordings and filtering data that corresponds to expressions of agitation. The data corresponding to agitation may be re-labeled as positive terms, while other data not associated with experiencing agitation may be re-labeled as negative terms. The re-labeled terms may thereby be used to train one or more AI based models to identify utterances that include characteristics of agitation.

In response to determining that the additional utterances have an agitated tone, a negative parameter may be added (e.g., appended) to the additional utterances, indicating that the initial wake-up words and/or phrases did not correspond to a legitimate attempt to activate the voice assistant. However, a positive parameter may be added to the received additional utterances in response to determining that they do not have an agitated tone, thereby indicating that the initial wake-up words and/or phrases do correspond to a genuine attempt to activate the voice assistant. These positive and negative parameters may be used to retrain the AI based models, e.g., as described in further detail below.

According to an example, which is in no way intended to limit the invention, FIG. 3B includes a graph 350 that plots audio signal volume over time for several predetermined tones. Graph 350 may thereby be used in some approaches to identify situations where the user is agitated by the fact that the voice assistant has been unintentionally activated, e.g., as a result of misinterpreting statements made by the user, the user inadvertently repeating wake-up words and/or phrases, etc. For example, plot "a" in graph 350 may be used to identify audio signals that convey the user is agitated (e.g., angry), while plot "b" is used to identify audio signals that convey the user is feeling disgust. Looking still to graph 350, plot "c" corresponds to a user experiencing fear, while plot "d" corresponds to a user experiencing happiness, and plot "e" corresponds to feeling neutral. Further still, plot "f" corresponds to a user experiencing a pleasant surprise, while plot "g" corresponds to a user experiencing sadness. The plots in graph 350 may thereby be compared against audio signals that are received from users in an attempt to identify similar signal profiles. In other words, the plots of known tones in graph 350 may be used to identify matching audio signals.

According to some approaches, the features extracted in operation 318 may be evaluated using one or more additional AI based models that have been trained to identify the general emotions of a user that made the additional utterances. For example, the additional AI based models may be trained using video recordings and/or scripted datasets that provide contextual information (e.g., body movement or "body language") which indicates the general state of the user while they are speaking. This training allows the additional AI based models to determine the emotional state of the user while they speak the words in the received utterances. For instance, the additional AI based models may use a frequency, amplitude, speed, overall profile, etc. of received audio signals to generate a summary of how the user was feeling while they produced the audio signals.

Again, the emotional state of the user provides valuable insight into the intent behind the audio signals that are received.

Method 300 advances from operation 320 to operation 322 in response to determining that the additional utterances do have an agitated (e.g., irritated) tone. In other words, method 300 identifies that the user did not intend to activate the voice assistant, and proceeds to operations 322. There, operation 322 includes ignoring the additional utterances received from the user. In other words, operation 322 includes intentionally not evaluating the additional utterances that are received in response to the voice assistant being activated. In some approaches, a warning (e.g., error message) may be returned to the user, indicating that the voice assistant did not identify any genuine prompts. Operation 322 may further include returning the voice assistant to a deactivated (e.g., sleep or low power) state.

From operation 322, method 300 again advances to operation 312 where the initial utterances that include the wake-up words are labeled as unintentional dialog initiation entries. A new labeled set of training data may thereby be formed and used to retrain the AI based models implemented in operation 306 to initially identify the wake-up words and/or phrases. See operation 314.

However, in response to determining that the additional utterances do not have an agitated tone, method 300 advances from operation 320 to operation 324. There, operation 324 includes causing the additional utterances to be processed. In other words, operation 324 includes evaluating the content of the additional utterances received from the user, and satisfying any requests, instructions, commands, prompts, etc. that are included therein. According to an example, which is in no way intended to be limiting, a user may submit a question for the voice assistant to answer in response to the voice assistant indicating that it has been activated and is ready to process requests. In this example, the question submitted by the user may be evaluated and solved before returning (e.g., outputting) an answer to the user.

While additional utterances may be received from a user following the activation of a voice assistant, the utterances may not result in any action being taken. For example, utterances that cannot be interpreted (e.g., understood) may simply be rejected and a warning may be returned to the user that submitted the utterances. In other approaches, the utterances themselves may not call for any action to be taken. According to another non-limiting example, a user who does not realize that the voice assistant has been activated may proceed to talk with another user, speak to themselves as they work through a problem, listen to music that includes words, etc.

Operation 326 thereby includes determining whether causing the additional utterances to be processed results in any action being taken. In other words, operation 326 includes determining whether words spoken by the user following activation of the voice assistant result in any logical and/or physical changes occurring to the system. In some approaches, operation 326 includes determining whether memory is accessed, processor throughput increases, sub-processes are performed and/or activated, etc., as a result of processing the additional utterances received from the user.

In response to determining that processing the additional utterances does not result in any action being taken, method 300 advances from operation 326 to operations 312 and 314, e.g., as described above. Thus, the AI based models may be retrained based on the outcome of applying method 300 to the audio signals received in operation 302. However, method 300 advances from operation 326 to operation 328 in response to determining that processing the additional utterances results in additional action being taken. There, operation 328 includes labeling the initial utterances that include the wake-up words as genuine dialog initiation entries. In other words, operation 328 includes determining that the initial utterances made by the user were intended to initiate the voice assistant, and that the supplemental utterances were made by the user to be submitted to the voice assistant for processing.

While unintentional dialog initiation entries may be labeled and used to retrain the AI based models to more accurately recognize audio signals that do not include genuine attempts to activate a voice assistant, genuine dialog initiation entries may also be used to retrain the AI based models. Operation 330 thereby includes using the labeled genuine dialog initiation entries to retrain the AI based models. As noted above, the fact that method 300 continually retrains the AI based models using the determined results, allows for the AI based models to make more accurate determinations over time. Thus, as operations of method 300 are repeated for audio signals received over time, the accuracy with which voice assistant is activated (e.g., awoken) is significantly improved. Accordingly, method 300 returns to operation 302 from operation 330, e.g., such that additional audio signals may be received and evaluated using the retrained AI based models.

It follows that method 300 is able to improve the accuracy with which voice assistants are activated (e.g., awoken) by analyzing the soundwave of user utterances (e.g., speech) as well as other contextual factors available in interactions between the user and the voice assistant. The improved accuracy is achieved, at least in part, by analyzing the voice of the user and the wake-up utterances themselves. For instance, incorporating the tone of user utterances improves the accuracy of the models developed in the approaches herein.

Approaches herein also include evaluating the audio signals themselves, thereby avoiding the processing throughput associated with converting audible sounds (e.g., user utterances) into textual entries (e.g., words). This also provides approaches herein the ability to train models using real user utterances without breaching privacy and without training specific models for different voice assistants. Moreover, continually providing contextual feedback allows for the AI based models used herein to gain insight as to whether the models correctly classified received audio signals. In other words, the contextual feedback continues to identify whether the model made a correct classification. The feedback may thereby improve (e.g., correct) the AI based models continuously over time with use.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method (CIM), comprising:
in response to receiving an audio signal having initial utterances from a user, determining whether the initial utterances include predetermined wake-up words by:
using a trained artificial intelligence (AI) based model to evaluate a tone of the initial utterances;
in response to determining that the initial utterances include the predetermined wake-up words, causing a voice assistant to initiate an interaction with the user;
in response to receiving additional utterances from the user that do not have an agitated tone, causing the additional utterances to be processed;
in response to determining that causing the additional utterances to be processed results in action being taken, labeling the initial utterances that include the wake-up words as genuine dialog initiation entries;
in response receiving additional utterances from the user that do have an agitated tone, labeling the initial utterances that include the wake-up words as unintentional dialog initiation entries;
causing the additional utterances to be ignored; and
using the labeled unintentional dialog initiation entries to retrain the AI based model.

2. The CIM of claim 1, further comprising:
using the labeled genuine dialog initiation entries to retrain the AI based model.

3. The CIM of claim 1, further comprising:
in response to determining that the initial utterances in the audio signal do not stop for a predetermined period following the initial utterances that include the wake-up words, labeling the initial utterances that include the wake-up words as unintentional dialog initiation entries; and
using the labeled unintentional dialog initiation entries to retrain the AI based model.

4. The CIM of claim 1, further comprising:
in response to determining that additional utterances are not received from the user following a predetermined period, labeling the initial utterances that include the wake-up words as unintentional dialog initiation entries; and
using the labeled unintentional dialog initiation entries to retrain the AI based model.

5. The CIM of claim 1, further comprising:
in response to determining that causing the additional utterances to be processed results in no action being taken, labeling the initial utterances that include the wake-up words as unintentional dialog initiation entries; and
using the labeled unintentional dialog initiation entries to retrain the AI based model.

6. The CIM of claim 1, wherein the trained AI based model is a trained machine learning model.

7. The CIM of claim 1, further comprising:
receiving a mixed audio signal having initial utterances from multiple users;
extracting individual audio signals from the mixed audio signal, each of the extracted individual audio signals having ones of the initial utterances that correspond to a respective one of the multiple users; and for each of the individual audio signals, determining whether the ones of the initial utterances in a given individual audio signal include the predetermined wake-up words.

8. A computer program product (CPP), comprising:
a set of one or more computer-readable storage media; and
program instructions, collectively stored in the set of one or more storage media, for causing a processor set to perform the following computer operations:
in response to receiving an audio signal having initial utterances from a user, determining whether the initial utterances include predetermined wake-up words by:
using a trained artificial intelligence (AI) based model to evaluate a tone of the initial utterances;
in response to determining that the initial utterances include the predetermined wake-up words, cause a voice assistant to initiate an interaction with the user;
in response to receiving additional utterances from the user that do not have an agitated tone, cause the additional utterances to be processed;
in response to determining that causing the additional utterances to be processed results in action being taken, label the initial utterances that include the wake-up words as genuine dialog initiation entries;
in response to receiving additional utterances from the user that have an agitated tone, label the initial utterances that include the wake-up words as unintentional dialog initiation entries;
cause the additional utterances to be ignored; and
use the labeled unintentional dialog initiation entries to retrain the AI based model.

9. The CPP of claim 8, wherein the program instructions are for causing the processor set to further perform the following computer operations:
use the labeled genuine dialog initiation entries to retrain the AI based model.

10. The CPP of claim 8, wherein the program instructions are for causing the processor set to further perform the following computer operations:
in response to determining that the initial utterances in the audio signal do not stop for a predetermined period following the initial utterances that include the wake-up words, label the initial utterances that include the wake-up words as unintentional dialog initiation entries; and
use the labeled unintentional dialog initiation entries to retrain the AI based model.

11. The CPP of claim 8, wherein the program instructions are for causing the processor set to further perform the following computer operations:
in response to determining that additional utterances are not received from the user following a predetermined period, label the initial utterances that include the wake-up words as unintentional dialog initiation entries; and
use the labeled unintentional dialog initiation entries to retrain the AI based model.

12. The CPP of claim 8, wherein the program instructions are for causing the processor set to further perform the following computer operations:
in response to determining that causing the additional utterances to be processed results in no action being taken, label the initial utterances that include the wake-up words as unintentional dialog initiation entries; and use the labeled unintentional dialog initiation entries to retrain the AI based model.

13. The CPP of claim 8, wherein the trained AI based model is a trained machine learning model.

14. The CPP of claim 8, wherein the program instructions are for causing the processor set to further perform the following computer operations:

receive a mixed audio signal having initial utterances from multiple users;

extract individual audio signals from the mixed audio signal, each of the extracted individual audio signals having ones of the initial utterances that correspond to a respective one of the multiple users; and for each of the individual audio signals, determining whether the ones of the initial utterances in a given individual audio signal include the predetermined wake-up words.

15. A computer system (CS), comprising:

a processor set;

a set of one or more computer-readable storage media;

program instructions, collectively stored in the set of one or more storage media, for causing the processor set to perform the following computer operations:

in response to receiving an audio signal having initial utterances from a user, determining whether the initial utterances include predetermined wake-up words by:

using a trained artificial intelligence (AI) based model to evaluate a tone of the initial utterances;

in response to determining that the initial utterances include the predetermined wake-up words, cause a voice assistant to initiate an interaction with the user;

in response to receiving additional utterances from the user that do not have an agitated tone, cause the additional utterances to be processed;

in response to determining that causing the additional utterances to be processed results in action being taken, label the initial utterances that include the wake-up words as genuine dialog initiation entries;

in response to receiving additional utterances from the user that have an agitated tone, label the initial utterances that include the wake-up words as unintentional dialog initiation entries;

cause the additional utterances to be ignored; and use the labeled unintentional dialog initiation entries to retrain the AI based model.

16. The CS of claim 15, wherein the program instructions are for causing the processor set to further perform the following computer operations:

in response to determining that: the initial utterances in the audio signal do not stop for a predetermined period following the initial utterances that include the wake-up words and additional utterances are not received from the user following the predetermined period, label the initial utterances that include the wake-up words as unintentional dialog initiation entries; and use the labeled unintentional dialog initiation entries to retrain the AI based model.

\* \* \* \* \*